United States Patent Office 3,309,402
Patented Mar. 14, 1967

3,309,402
3-NITRO-2-SULFONIC ACID SUBSTITUTED DERIVATIVE OF THE DIELS-ALDER ADDUCT OF TWO MOLECULES OF HEXACHLOROCYCLOPENTADIENE AND ONE MOLECULE OF NAPHTHALENE
Weldon M. Padgett II, Berkeley, Calif., assignor to Fundamental Research Company, Berkeley, Calif., a partnership
No Drawing. Filed Nov. 15, 1963, Ser. No. 323,885
1 Claim. (Cl. 260—505)

This invention relates to naphthalene chemistry. It is concerned particularly with a novel method of preparing 2,3-naphthalenediol, a compound widely used in the manufacture of diazo copying papers. The compound has heretofore been quite high in price, chiefly because of the isomer problems and handling difficulties associated with the standard method of its preparation from 2-hydroxy-3,6-naphthalene disulfonic acid by caustic fusion and subsequent hydrolysis.

My invention is based on my discovery that the Diels-Alder adduct of two molecules of hexachlorocyclopentadiene and one molecule of naphthalene, hereinafter designated for convenience as "DHA" (di-hex-adduct), the preparation of which is described in United States Patent No. 2,658,926, must be first sulfonated and then nitrated, a sulfonic acid group entering first and exclusively into the 2-position of the napthalene nucleus and a nitro group entering thereafter and exclusively into the 3-position. The DHA-3-nitro-2-sulfonic acid thus produced is subsequently converted by appropriate procedures to the desired 2,3-naphthalenediol.

Although my process involves several more steps than the present standard method decsribed above, and hence might appear to be uneconomical, I have found that the yields and purity obtained with my process are uniformly so high as to make my process the preferred way of arriving at the desired end product.

A principal object of the invention is therefore to provide a novel method for preparing 2,3-naphthalenediol in high yield and of high purity.

Another object of the invention is to provide a process for the preparation of DHA-3-nitro-2-sulfonic acid, a critical intermediate in the above method.

A further object of the invention is to provide DHA-3-nitro-2-sulfonic acid as a new and useful composition of matter.

A further object of the invention is to provide 3-nitro-2-naphthalene sulfonic acid as a new and useful composition of matter.

A still further object is to provide for the preparation of other intermediates having utility, particularly in the manufacture of dyes and pigments.

The manner of attainment of these and other objects of my invention will become apparent upon further consideration of this specification and the claim.

A more complete understanding of my invention may be obtained from the following outline of a typical procedure which I have used very successfully.

The DHA is dissolved in an appropriate solvent which is resistant to both sulfur trioxide and to fuming nitric acid (white or red), my preferred sulfonating and nitrating agents. Methylene chloride is the solvent which I prefer for this purpose, although other chlorinated solvents, such as ethylene dichloride, and also the lower boiling, i.e., 25°–125° C. B.P., a fluorochlorocarbons, sometimes identified by "Freon" (a trademark of the Du Pont Co.) or by "Genetron" (a trademark of the Allied Chemical Corp.), are also excellent.

I have found that, contrary to expectation, sulfonation of the DHA must precede nitration. The reverse process will not function. Evidently in this system, as opposed to normal aromatic systems, the presence of an already attached nitro group prevents entry of a sulfonic acid group, even when as powerful a sulfonating reagent as sulfui trioxide is employed.

The sulfonic acid group enters exclusively into the 2-position. Once this group is attached, the nitro group which follows attaches itself exclusively in the 3-position. There appears to be no tendency by the nitric acid to displace the sulfonic acid group already present, contrary to what might be expected in a normal benzenoid system. Infra-red spectroscopy and other analytical methods which I have used have failed to disclose the presence of even traces of other isomers.

DHA-3-nitro-2-sulfonic acid is interesting in its own right in that in the presence of an alkali, in aqueous or alcoholic solution, the sulfonic acid group is readily hydrolyzed and is substituted by a hydroxy group. This property can be used advantageously for the modification of cotton fibers, in which case the nitro-DHA molecule appears to attach itself by means of an ether linkage to the cotton fibers. The nitro group may thereafter be reduced to an amine which can be diazotized and subsequently coupled to form fibre-fast dyes. Once, however, the DHA-nitro-sulfonic acid has been pyrolyzed, the resulting 3-nitro-2-naphthalene sulfonic acid loses its property of nucleophilic activity. The only exception that I know of to the rule that the 2 and 3 positions of naphthalene do not influence one another is in the case of 2,3-dinitronaphthalene.

The DHA-nitrosulfonic acid resulting from the sulfonation and nitration described above is now preferably converted to the magnesium salt, which I have found to pyrolyze with a minimum of coke production (much less than if the DHA-nitrosulfonic acid itself is pyrolyzed), to re-form hexachlorocyclopentadiene (which distills off in the pyrolysis) and leave as a residue the magnesium salt of 3-nitro-2-naphthalene sulfonic acid. This salt is reduced, as by any conventional way of reducing a nitro group to an amino group, to 3-amino-2-naphthalene sulfonic acid (a valuable and rare intermediate in its own right in the manufacture of dyes and pigments), which is then subjected to a hydrolysis type reaction, preferably the Bucherer reaction with sodium bisulfite, to produce 3-hydroxy-2-naphthalene sulfonic acid, a useful coupling component in the preparation of azo dyes and pigments, and which has heretofore defied preparation by a commercially feasible process. This latter compound may then be fused with caustic soda to yield the desired 2,3-naphthalenediol.

Other sulfonating agents which may be satisfactorily employed are, for example, oleum and chlorosulfonic acid.

The pyrolysis step may be practiced at a temperature range of from about 200° C. to about 300° C. at either atmospheric or sub-atmospheric pressures or in the presence of a carrier gas or vapor, e.g., nitrogen, carbon dioxide, methane, and water vapor. The preferred cracking temperature is from about 240° C. to about 250° C. and the preferred pressure is about 1 mm. Hg.

Detailed illustrative procedures for carrying out the process steps outlined above are given in examples below. The practice of the process of the invention is obviously not limited to or by these exemplary procedures.

*Example I.—Preparation of DHA-3-nitro-2-sulfonic acid*

40 grams of finely divided DHA, prepared according to the method described in United States Patent No. 2,658,926, were mixed with 130 grams of dry methylene chloride in a 3-necked, round bottom flask equipped with reflux condenser, mechanical stirrer, and a dropping burette containing 7.5 grams of liquid sulfur trioxide free of polymer. The sulfur trioxide was added with stirring while the temperature of the mixture was held below 30° C. by external cooling. After addition of all of the sulfur trioxide the reaction mixture appeared as a yellow-brown solution, with little or no suspended solids. Sulfonation at the same temperature was continued for an hour, at the end of which time 110 grams of white fuming (98%+) nitric acid were added to the reaction flask and the mixture heated to reflux temperature (44° C.). The addition of the nitric acid caused precipitation. The precipitate slowly dissolved upon further heating. When the precipitate had entirely dissolved, nitration was essentially complete. The nitration required about 2½ hours, and its completion was checked with infra-red spectroscopy.

An excess of water was added to the post-nitration reaction mixture. All of the methylene chloride solvent was removed by distillation. The solid reaction product, DHA-3-nitro-2-sulfonic acid, was separated from the aqueous phase by filtration.

The DHA-3-nitro-2-sulfonic acid thus prepared may be pyrolyzed directly to yield hexachlorocyclopentadiene and 3-nitro-2-naphthalene sulfonic acid. I have found, however, that far less coke is formed if the DHA-3-nitro-2-sulfonic acid is converted prior to cracking to a metallic salt, particularly an alkali metal, e.g., sodium, or an alkaline earth metal, e.g., calcium, salt, and preferably the magnesium salt.

*Example II.—Preparation and pyrolysis of magnesium salt of DHA-3-nitro-2-sulfonic acid*

40 grams of the solid DHA-3-nitro-2-sulfonic acid prepared in Example I was reacted in an aqueous slurry with 1.1 grams (a 10% mole excess) of magnesium oxide, and the product was baked dry for cracking. Cracking was carried out at 240–250° C. and 1 mm. Hg pressure. Hexachlorocyclopentadiene distilled off overhead, leaving a residue of crude magnesium nitronaphthalene sulfonate. The latter was dissolved in hot water. The resulting solution was first cooled and filtered to remove uncracked material, unreacted magnesium oxide, and other solid particles, and was then evaporated to deposit the magnesium salt of 3-nitro-2-naphthalene sulfonic acid as a yellow powder containing about 15 percent of water.

This compound was then converted to 3-amino-2-naphthalene sulfonic acid. While a variety of conventional procedures, e.g., the Beauchamp method (iron filings in an acidic medium, stannus chloride, electrolytic, sodium hydrosulfite) can be employed for reduction of the 3-nitro group to the corresponding amino group, I prefer to use hydrogenation with gaseous hydrogen in the presence of a palladium catalyst as described in Example III.

*Example III.—Preparation of 3-amino-2-naphthalene sulfonic acid*

A solution of 10.0 grams of the magnesium salt of 3-nitro-2-naphthalene sulfonic acid, prepared as in Example II, in 75 ml. water was placed under a positive pressure of hydrogen gas in the presence of a palladium hydrogenation catalyst. This catalyst was prepared by reducing 1.0 gram of 8.7 percent by weight of $PdCl_2$ on powdered activated carbon, thus forming finely divided palladium on the carbon. The theoretical amount of hydrogen was taken up in about 2 hours. The suspension was then filtered, and the insoluble catalyst residue was leached with hot 10 percent sodium hydroxide to recover adsorbed product. The leachings and filtrate were combined and made slightly acidic with hydrochloric acid, whereupon a tan solid product was precipitated. The mixture was chilled with ice and then filtered to recover the solid product. This was washed with dilute hydrochloric acid and dried under vacuum, yielding 8.3 grams of 3-amino-2-naphthalene sulfonic acid, equivalent to 94 percent of theoretical.

The 3-amino-2-naphthalene sulfonic acid thus produced was next converted to 3-hydroxy-2-naphthalene sulfonic acid. Again, a variey of known procedures may be utilized to replace the amino group in the 3-position with an hydroxy group, but I prefer to effect the hydrolysis by means of the Bucherer reaction, as outlined in Example IV.

*Example IV.—Preparation of 3-hydroxy-2-naphthalene sulfonic acid*

14.00 grams of 3-amino-2-naphthalene sulfonic acid, prepared as in Example III, in 120 ml. of 40 percent aqueous solution of sodium bisulfite was heated to 140–150° C. in an autoclave with stirring for 18 hours. The reaction mixture was then made basic with sodium hydroxide, digested for 1 hour on a steam bath and filtered to remove foreign matter. The filtrate was acidified with hydrochloric acid, whereupon a portion of the 3-hydroxy-2-naphthalene sulfonic acid was precipitated. The liquid was further concentrated by evaporation to precipitate more of the compound, then cooled and filtered, yielding 13.0 grams of the product, equivalent to 93 percent of theoretical.

The 3-hydroxy-2-naphthalene sulfonic acid thus produced was converted to 2,3-naphthalenediol, the desired end product, by fusion with solid sodium hydroxide, as described in Example V.

*Example V.—Preparation of 2,3-naphthalenediol*

4.10 grams of 2-naphthol-3-sulfonic acid, prepared according to the method of Example IV, were intimately mixed by grinding in a mortar with 3.66 grams of solid sodium hydroxide and the mixture heated at 300° C. for 3 hours. The fusion mixture was then cooled, dissolved in 100 ml. of water, digested on a steam bath for 30 minutes and then acidified with gaseous sulfur dioxide to precipitate the desired 2,3-naphthalenediol. The precipitate was washed with water and dried, yielding 2.51 grams of dried product, equivalent to 86 percent of theoretical.

The processes of my invention are not limited to the detailed procedures set forth in the examples. Other known sulfonating and nitrating agents, for example, may be employed instead of the preferred sulfur troxide and white fuming nitric acid. Similarly, other known procedures may be utilized for accomplishing the reduction, hydrolysis, and other process steps involved. To a limited extent the sequence of process steps may be altered, as, for example, the last two steps in the process, the replacement with an hydroxyl group of first the 2-amino group and later of the 3-sulfonic acid group, may be reversed, though with a somewhat lower yield of final product. These and many other modifications and alternatives which will suggest themselves to one skilled in the art involved are deemed to be included within the scope of the invention as defined in the claim.

The novel intermediate compounds, DHA-3-nitro-2-sulfonic acid and 3-nitro-2-naphthalene sulfonic acid, have surprising and unexpected thermal stability. They are stable in solid condition within the temperature range of 200°–300° C., whereas nitro-naphthalene compounds which are in solid condition at temperatures on the order of 150° C. have a uniform tendency to decompose at temperatures in excess of 150° C.

I claim:

The 3-nitro-2-sulfonic acid substituted derivative of the Diels-Alder adduct of two molecules of hexachlorocyclopentadiene and one molecule of naphthalene, said derivative having the structural formula

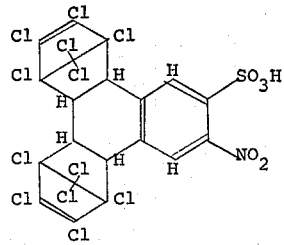

having the empirical formula $C_{20}H_7Cl_{12}NO_5S$, and having a molecular weight of 799.

References Cited by the Examiner

UNITED STATES PATENTS

| | | | |
|---|---|---|---|
| 2,658,913 | 10/1953 | Hyman et al. | 260—543 |
| 2,658,926 | 10/1953 | Hyman et al. | 260—649 |
| 2,665,313 | 1/1954 | Lish | 260—621 |
| 3,177,246 | 4/1965 | Look | 260—505 |

OTHER REFERENCES

Danish et al.: Journal of the American Chemical Society, vol. 76, Dec. 5, 1954, pp. 6144–6150.

LORRAINE A. WEINBERGER, *Primary Examiner.*

M. B. WEBSTER, *Assistant Examiner.*